United States Patent [19]
Heuer, Sr.

[11] 3,771,197
[45] Nov. 13, 1973

[54] COMBINATION FISH SKINNING SCALING AND KNIFE TOOL

[76] Inventor: Walter Cyrus Heuer, Sr., 5928 Spruce, Kansas City, Mo. 64130

[22] Filed: May 8, 1972

[21] Appl. No.: 251,246

[52] U.S. Cl. .................................................. 17/68
[51] Int. Cl. ............................................. A22c 25/00
[58] Field of Search ................................. 17/68, 69

[56] References Cited
UNITED STATES PATENTS

| 2,654,120 | 10/1953 | Tifft | 17/68 |
| 2,434,550 | 1/1948 | Daniel | 17/68 |
| 717,206 | 12/1902 | Jacoby | 17/68 |

Primary Examiner—Robert Peshock

[57] ABSTRACT

A hand manipulated device for cutting, skinning, and scaling fish. This device consists primarily of a pair of pivotable members with jaws, one of the jaws receiving a cutting blade or a scaling blade.

1 Claim, 2 Drawing Figures

PATENTED NOV 13 1973 3,771,197

COMBINATION FISH SKINNING SCALING AND KNIFE TOOL

This invention relates to hand tools, and more particularly to a combination fish skinning, scaling, and knife tool.

It is therefore the primary purpose of this invention to provide a combination tool which will have the capability of being used for a variety of purposes in preparing fish.

Another object of this invention is to provide a combination tool which will consist of a pair of pivotable levers having jaws for gripping the skin of a fish in order to remove the skin therefrom.

Another object of this invention is to provide a tool of the type described, which will have one of the jaws slotted so as to removably receive a cutting blade or a scaling member.

A further object of this invention is to provide a combination tool of the type described, which will have set-screw means for the removable components stationary.

Other objects of the present invention are to provide a combination fish skinning, scaling, and knife tool which is simple in design, inexpensive to manufacture, rugged in construction, easy to use and efficient in operation.

Figure 1:
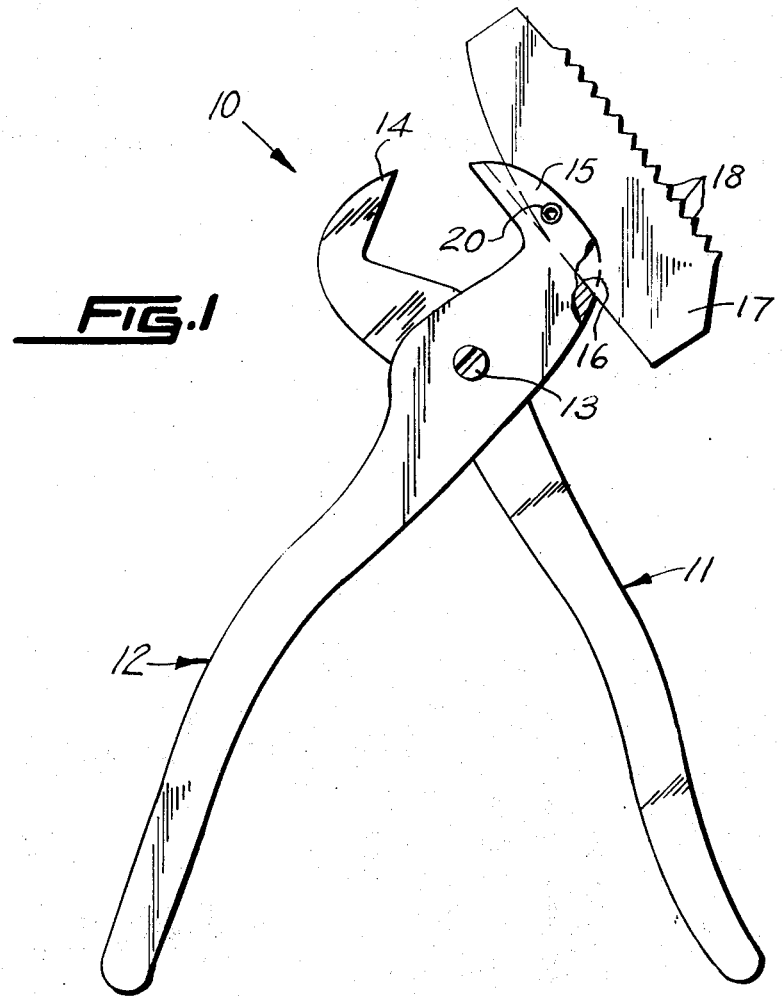
Figure 2:
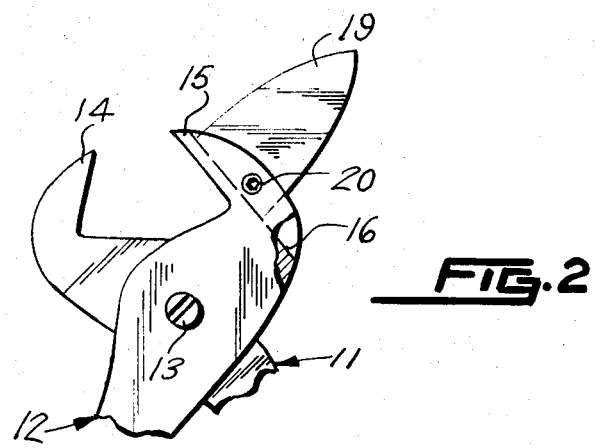

These and other objects will be readily evident upon a study of the following specification and the accompanying drawing wherein:

FIG. 1 is a plan view of the present invention shown partly broken away with a scaling blade shown secured therein; and FIG. 2 is a fragmentary plan view of the invention showing a knife blade therein.

According to this invention, a combination tool 10 is shown to have a handle 11 and a handle 12 which are pivotally secured together by means of screw fastener 13. Handle 11 is terminated at one end by a jaw 14 and handle 12 is terminated at one end by an oppositely opposed jaw 15. Jaws 14 and 15 are used to grippingly engage the skin of fish so to be scaled.

It will be noted that jaws 14 and 15 of tool 10 maybe used for a variety of purposes in a well known manner.

Jaw 15 is provided with a elongated slot 16 which may removably receive blade 17 having teeth 18 for use in scaling a fish.

A removable cutting blade 19 may also be received within slot 16 for use in slitting a fish. Jaw 15 is provided with a set screw 20 for rendering blade 17 or blade 19 secure within the slot 16 and set screw 20 is of the well known type that utilizes a rod type wrench of hexagonal cross sectional configuration.

In use, a fish maybe scaled by placing blade 17 within the slot 16 of jaw 15. The blade 17 is then secured by means of the set screw 20. The user grasps the handles 11 and 12 and pivots them closed after which the teeth 19 maybe used to remove the scales from the fish.

The cutting blade 19 maybe subsittuted for blade 17 in order to slit the skin of the fish. Jaws 14 and 15 maybe closed upon the skin in order to apply a pulling motion so as to remove the skin from the fish. The cutting blade 19, when secured within slot 16 of jaw 15, is used, also for opening the abdominal cavity of the fish.

What I now claim is:

1. A combination tool for skinning, scaling, and cutting a fish, comprising in combination a pair of pviotally connected handles, jaw means carried by said handles for grippingly engaging portions of a fish, a removable scaling blade carried by said tool and a removable cutting blade carried by said tool, said handles being terminated at one end by jaw members comprising said jaw means, said jaw members being used for grippingly engaging portions of a fish, and one of said jaw members being provided with a straight slot along an outer edge thereof for receiving either said scaling blade or said cutting blade, said slot being at approximately right angle to an axis of said handle with which said jaw is integral, said scaling blade being smooth on one longitudinal edge and provided with a plurality of equally spaced apart teeth on the opposite longitudinal edge, said teeth providing a means for removing scales from said fish, said cutting blade comprising a generally triangular flat member with arcuate opposite side edges that taper to a point, said cutting blade and said scaling blade when placed within said slot being held fast by means of a said screw threaded in said jaw and bearing against one of the sides of said blades in order to encroach upon it so that it may be held fast without movement when the tool is used for cutting or scaling.

* * * * *